United States Patent [19]

Keats

[11] 4,048,483

[45] Sept. 13, 1977

[54] DATA HANDLING SYSTEMS

[75] Inventor: Albert Brian Keats, Dorchester, England

[73] Assignee: United Kingdom Atomic Energy Authority, England

[21] Appl. No.: 708,020

[22] Filed: July 23, 1976

[30] Foreign Application Priority Data

July 25, 1975  United Kingdom ............... 31269/75
May 7, 1976  United Kingdom ............... 18705/76

[51] Int. Cl.$^2$ ............................................. G06F 11/00
[52] U.S. Cl. ......................... 235/153 A; 235/153 AC
[58] Field of Search ..... 235/153 A, 153 AE, 153 AC; 340/347 AD, 146.1 BE

[56] References Cited

U.S. PATENT DOCUMENTS

| | | | |
|---|---|---|---|
| 3,469,084 | 9/1969 | Garrett et al. ..................... | 235/153 A |
| 3,603,772 | 9/1971 | Paine ................................. | 235/153 A |
| 3,639,778 | 2/1972 | Cereghino et al. ......... | 340/146.1 BE |
| 3,745,561 | 7/1973 | Van Dijk et al. ............. | 340/347 AD |
| 3,895,223 | 7/1975 | Neuner et al. .............. | 340/146.1 BE |

*Primary Examiner*—Charles E. Atkinson
*Attorney, Agent, or Firm*—Larson, Taylor and Hinds

[57] ABSTRACT

A data handling system receives analogue signals on a number of input lines by scanning the lines continually. The input signals are set into a register and after each scan their positions shifted by one place. A/D converters produce digital signals from these and a computer compares the digital signals with stored threshold data to yield a status binary 1 or 0 according to whether the inputs are inside or outside the threshold. Test signals are interleaved with the analogue signals. The status signals are assembled in a register and continuously recycled so that a constant stuck at 1 or stuck at 0 defect is at once recognized. The input lines are replicated and a majority vote is taken before any actuator is exercised.

6 Claims, 6 Drawing Figures

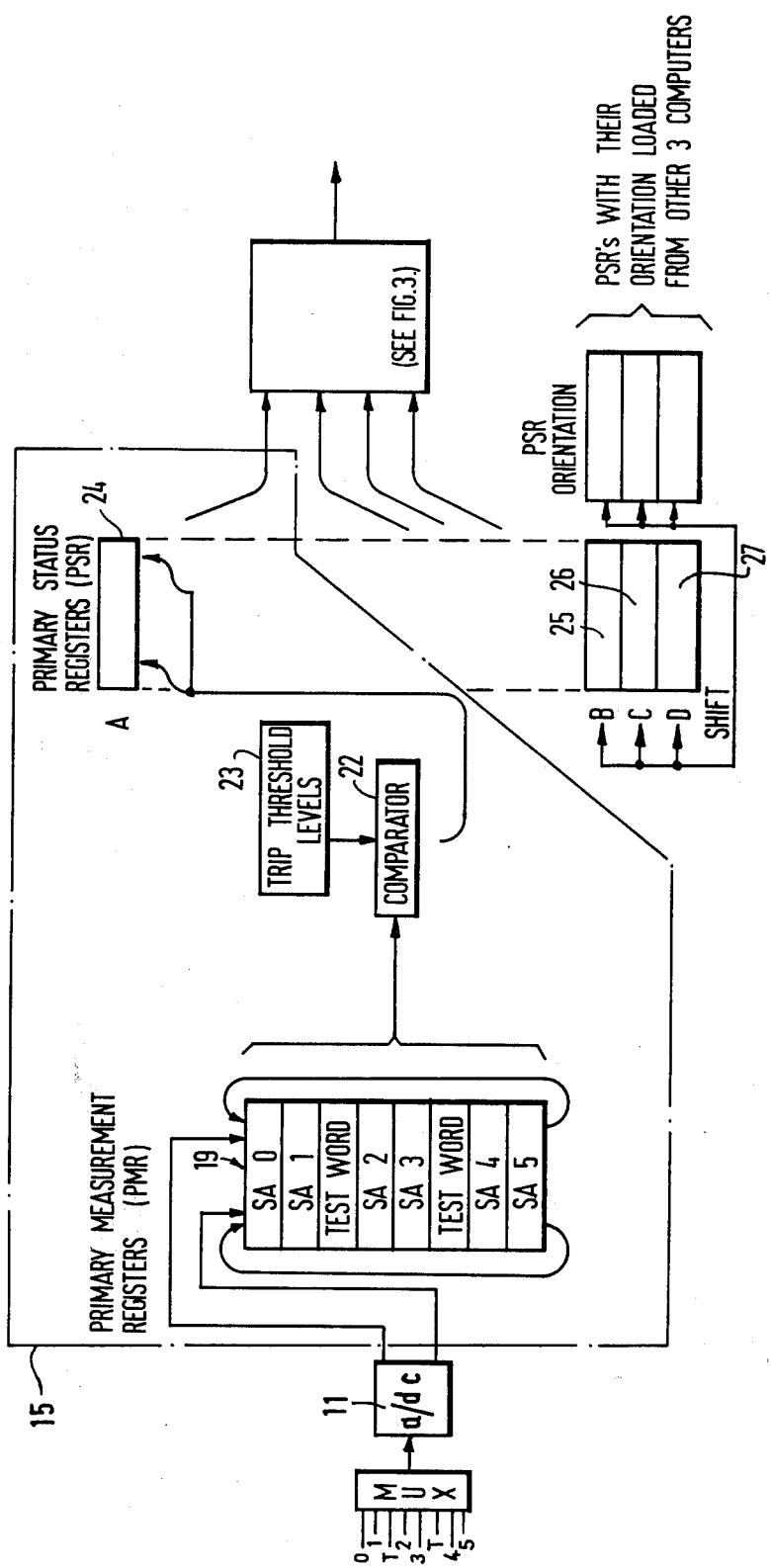

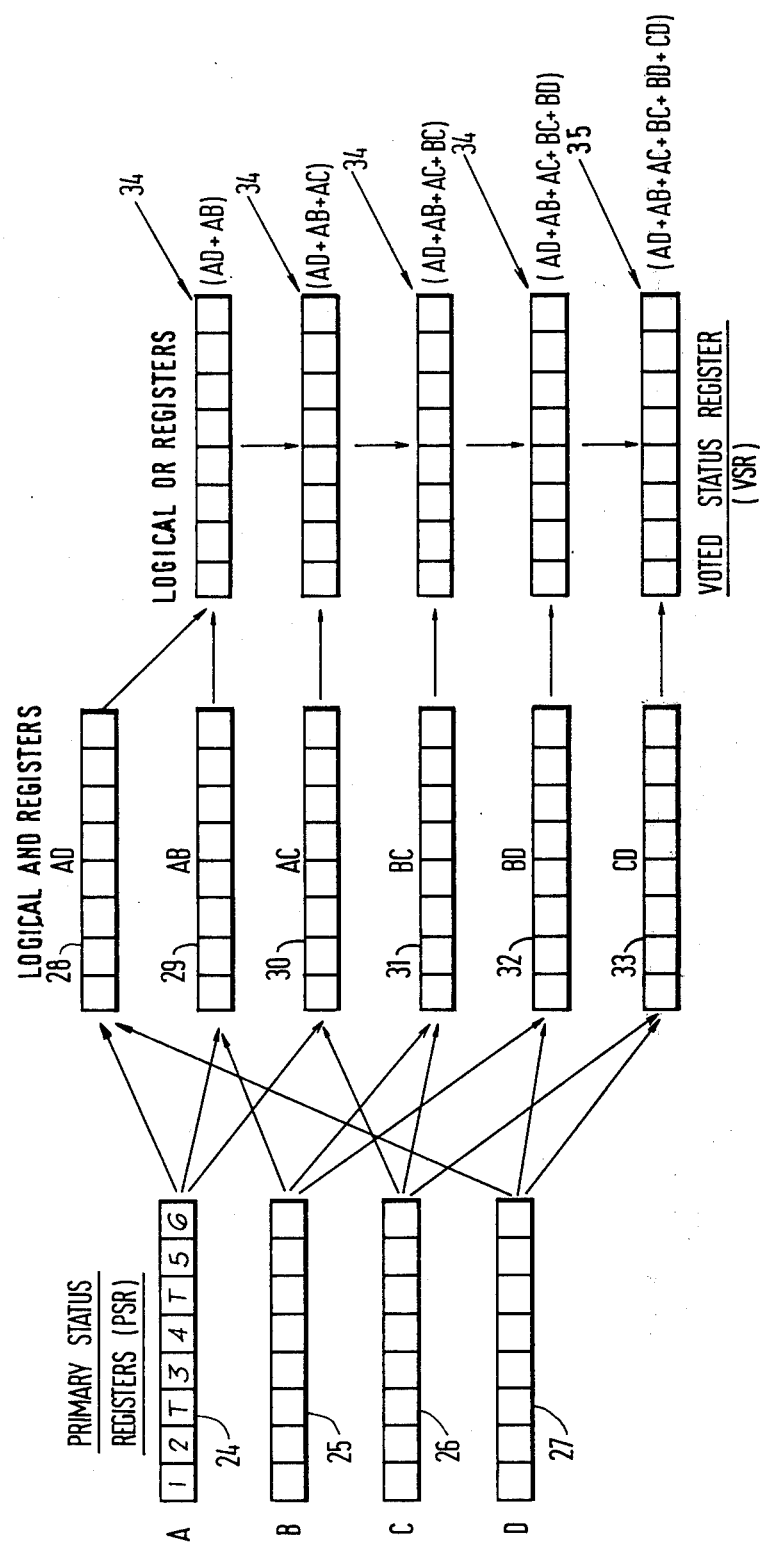

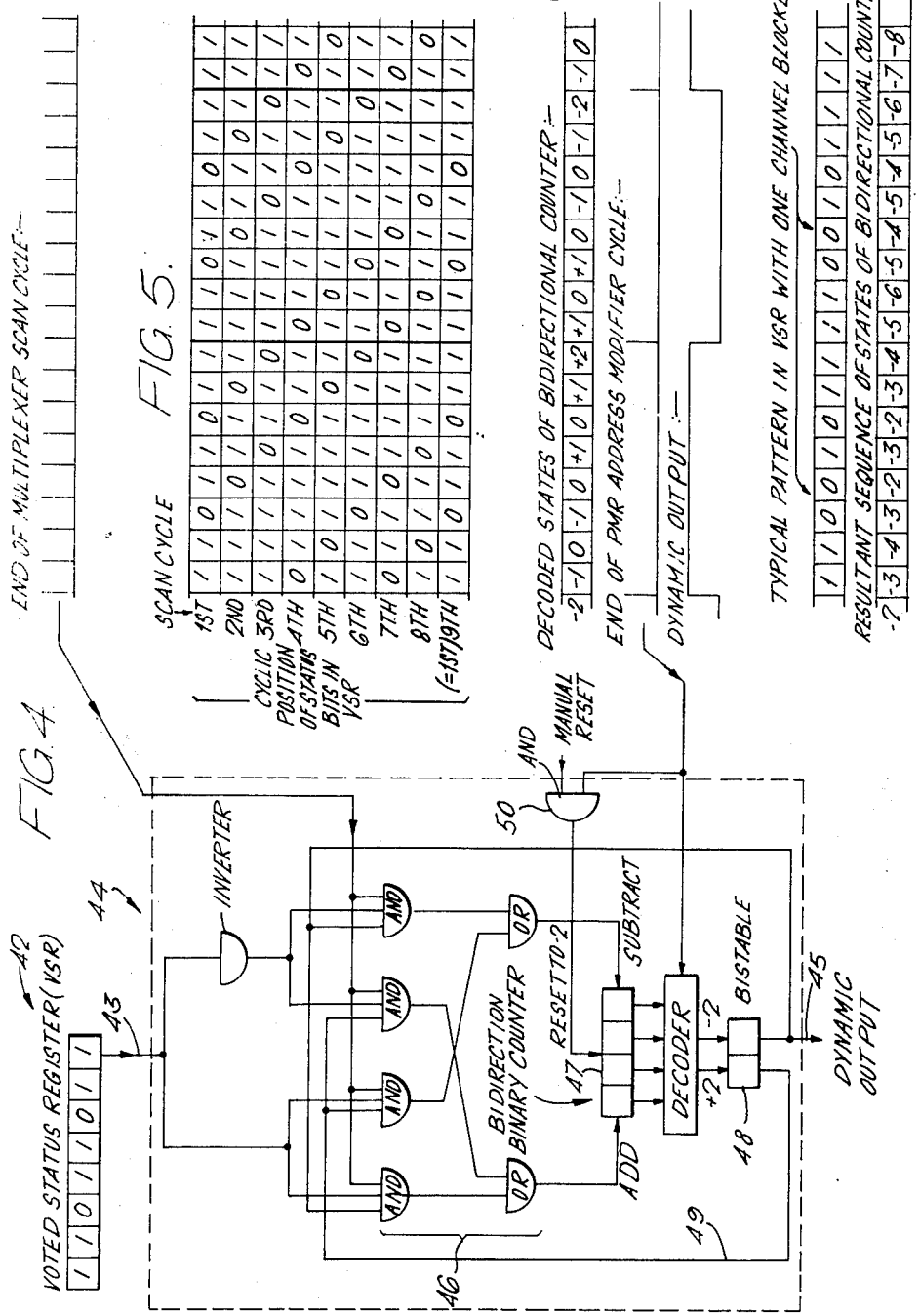

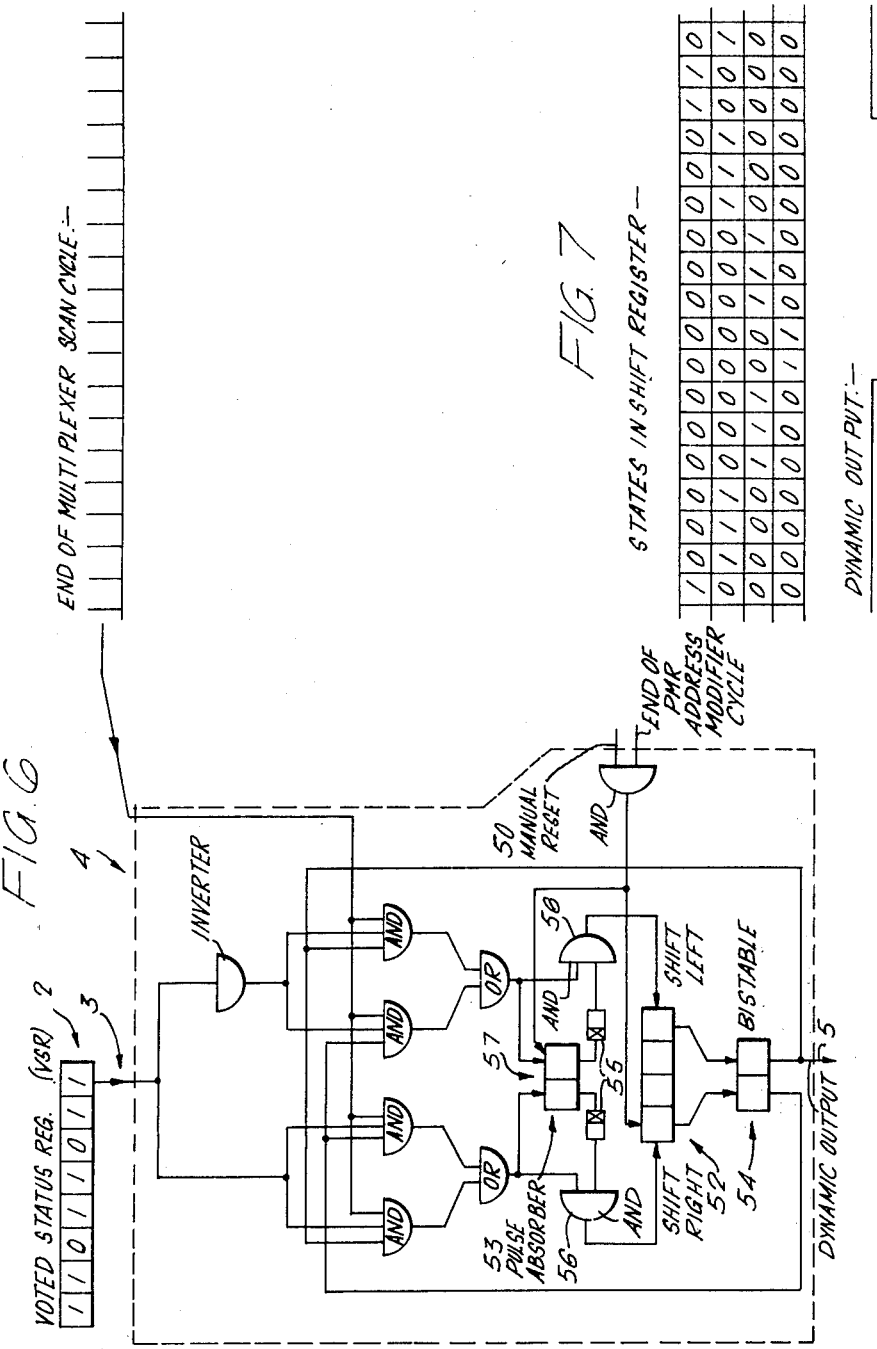

DATA HANDLING SYSTEMS

BACKGROUND OF THE INVENTION

This invention relates to data handling systems employing electronic computers for the control of machinery and industrial processes. Increasingly electronic computers are being relied upon for exercising these controlling functions and it is a continuing requirement to guard against the consequence of any computer failure or malfunction. One mode of guarding against failure is by the use of redundancy which involves replicating both the input data channels and those computer circuits which operate on the input data so giving parallel outputs. Then if the operative circuit fails another is available to take over control. As an extension of this technique to guard against the effects of malfunction, e.g. spurious signals which may appear on the output line which is for the time being in control, it has further been proposed to arrange that the actuator responding to the output signal is only exercised when a majority of the parallel outputs coincide in value or in sign. The actuator or other control is then not exercised in response to a minority of output signals. This technique is known as majority voting and is effected by majority logic circuitry.

Applying this general technology it has already been proposed to apply a number (say, $m$) groups of (say, $n$) analogue inputs derived from plant transducers to separate analogue to digital converters and thence to feed digital signals from each group to a digital computer. After a predetermined computation has been completed, the quotient is matched against data residing in a data store and the resultant fed into a majority logic circuit where a majority decision is made and used to operate, or withhold from operation, some control.

This system suffers from the disadvantage apparent in most binary systems in as much as most faults result in a "stuck at 1" or a "stuck at 0" state and since either a steady 1, or 0, is a normal operational condition, the fault is not recognised and can become manifest only by some incorrect and perhaps dangerous exercise of a plant controller.

SUMMARY OF THE INVENTION

According to the present invention there is provided a data system having i. a scanning means for scanning a number of analogue signals from independent input lines, cyclically, ii. a test signal injection means by which test signals are interleaved between at least two of said number of analogue signals, iii. an analogue to digital converter means receiving said analogue signals and said test signals and delivering equivalent digital output signals, iv. a primary measurement shift register (PMR) connected to receive said digital output signals and operable to overwrite or recycle said digital signals after each complete scan made by the scanning means with freshly scanned signals, v. signal extraction means for extracting signals from the shift register (PMR), vi. comparator means for receiving extracted signals and comparing them with stored threshold data to yield a binary 1 or 0 according to the value of each extracted signal relative to said threshold data, vii. a primary status register (PSR) in which the digital bits yielded by the comparator means are assembled as a binary word in which the positions of bits are advanced by one space on each cycle of the scanning means and viii. a majority voting circuit responsive to a majority $m$ out of $n$ status bits indicating an out of tolerance condition.

In this way a means is provided for continuously refreshing the input data by cyclicly introducing fresh input data signals and this is achieved by continually scanning the changing input data and preferably continually interleaving it with test signals as it is fed into a digital store in cyclic fashion. In a typical case a plant may have a number, $m$ groups of $n$ transducers yielding a measure of the same parameter within its group. To operate on this data, $n$ data handling channels are provided, each channel receiving $m$ input data signals, one from each group and these may be interleaved with test data signals from a local source. Again, in each channel the sequence of input data and test signals are preferably continually scanned, digitised and cycled through a primary measurement shift register of a digital computer. In the computer these measurement signals are continually compared with threshold data indicative of some critical plant conditions and the result will be an $m$ bit status binary word, the value of each bit being determined by the comparison made. Each channel produces a similar status word in a similar manner and these are fed into a primary status store register. From the $n$ status stores the signals are extracted for supplying a majority voting circuit.

Advantageously apparatus for operating as described in $m$ groups, each of $n$ input signals comprises a source of test analogue signals and $n$ data channels, each channel comprising a scanner for continually scanning $m$ different input signals interleaved with test signals, the apparatus including means for converting the scanned signals into digital binary form, a primary measurement register through which the continuously scanned data is continuously cycled, a digital computer, a source of pre-determined threshold signals, a comparator operable to compare signals in the primary measurement register including test data signals, with the threshold signals, a primary status register for receiving data words assembled in consequence of the comparison, said status words being as a result of the cyclic relocation of data in the primary measurement register and a majority voting circuit arranged to operate on data in each of $n$ primary status registers.

DESCRIPTION OF THE DRAWINGS

In order that the invention may be better understood a computer-based safety system incorporating the invented data handling facility will now be described with reference to the accompanying drawings in which FIG. 1 a typical layout of a data handling system based on quadruple redundancy FIG. 2 is a block diagram showing the principal components of a computer in FIG. 1, and FIG. 3 is a diagram showing a majority-voting subroutine or microprogramme supplementing the explanation of FIG. 2.

FIGS. 4 and 6 are diagrams of a pattern recognition circuits and

FIGS. 5 & 7 are diagrams showing the cyclic position of status bits in the voted status register.

Figure 1:
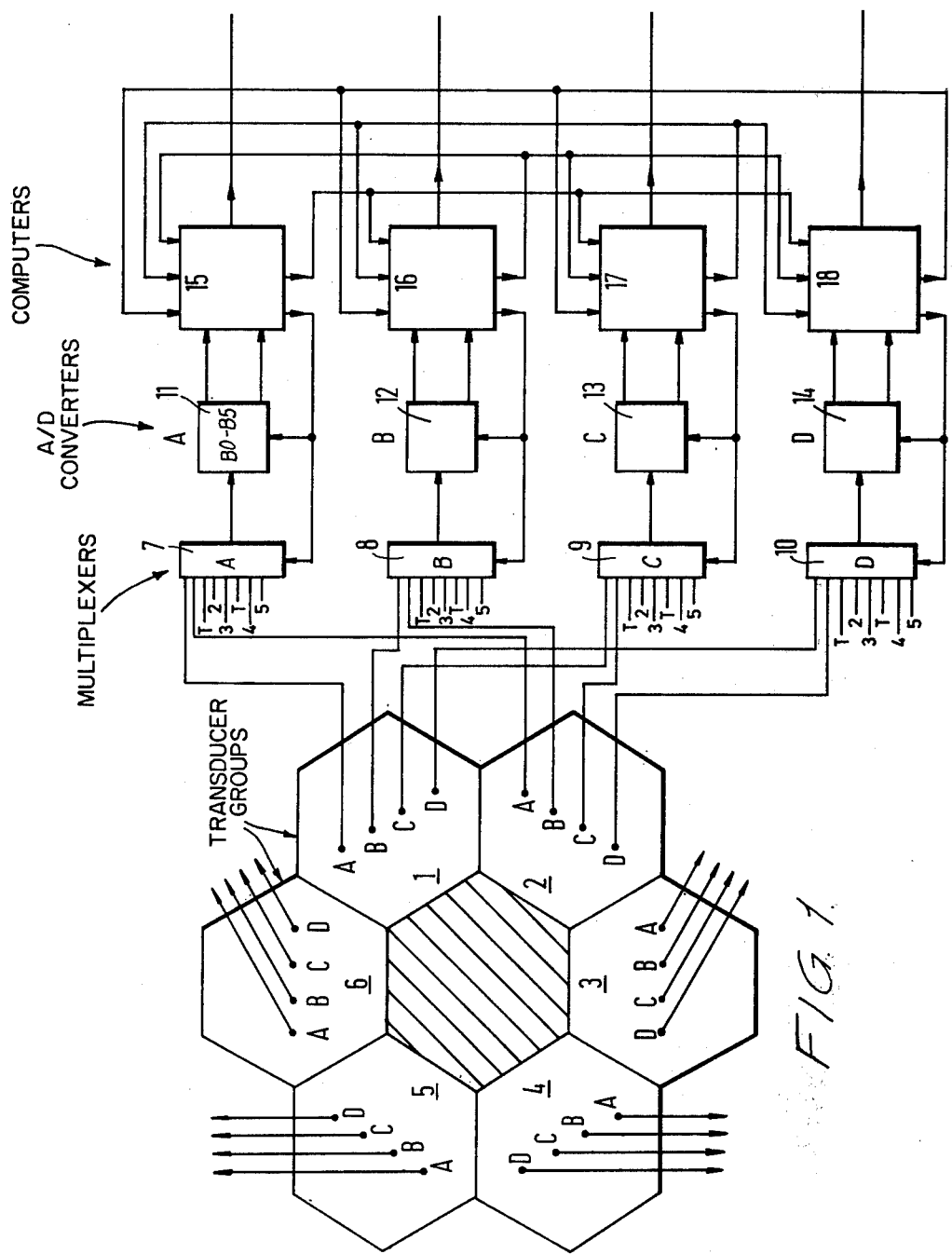

The system shown in FIG. 1 is arranged to monitor electrical signals originating from each of six locations of a plant. At each location there are four transducers.

sensing the same parameter and yielding outputs A, B, C, D to provide redundancy. The outputs A–D thus fall into six groups 1–6 and a different one from each group is fed to one of four multiplexers 7–10 as shown.

Thus the four channels in any one group will be scanned by a different multiplexer. The scanned signals are analogue signals and are passed to an analogue to digital (a/d) converter thence to be delivered to a digital computer at a rate dictated by the response time required. There are thus four a/d converters 11–14 and four associated digital computers 15–18.

The present invention aims to maintain dynamic conditions throughout the system. Firstly of course the provision of a multiplexer scanning analogue signals inherently yields a dynamic output; unless all its inputs happen to be of identical magnitude. However, where they are likely to lie close together the test inputs are interjected between the operational inputs. The test inputs which are indicated by the letter T are interjected between operational inputs 1–2 and 3–4 and are of a complementary form ie one may have the address 010; the other 101. This will test the address lines for stuck at 1 or 0 faults.

The address allocation for the six groups shown in FIG. 1 plus the two test voltages would be expressed as

| Group | MUX Address | a/d Converter Output |
|-------|-------------|----------------------|
| 1     | 000         | Digitised Measurement |
| 2     | 001         | Digitised Measurement |
| Test  | 010         | $x/3$ (01010101)      |
| 3     | 011         | Digitised Measurement |
| 4     | 100         | Digitised Measurement |
| Test  | 101         | $2x/3$ (10101010)     |
| 5     | 110         | Digitised Measurement |
| 6     | 111         | Digitised Measurement | where $x$ = full scale analogue measurement digitised as 11111111

It will be observed that the analogue test voltages required to produce the two complementary digital outputs are in the ratio 1:2 and their sum is the full scale range $x$ of the a/d converter. This facilitates the checking to show that the multiplexer is scanning through these two points.

The eight a/d converter readings obtained from each scan by the multiplexer are loaded into a group of primary measurement registers (PMR) of which one group is shown at 19. The values are extracted between each input scan for comparison in comparator 22 with trip threshold levels from store 23 and for validity checks on the test data. The dynamic mode of operation is maintained within the primary measurement registers (PMR) themselves by cyclic relocation of the primary measurement data in the registers. This is achieved by advancing the PMR address relative to the multiplexer by one place on each complete scan so that all data including the test data are moved forward one place on each successive scan. On a cycle of 8 scans therefore, the test data appears in each of the 8 register places and will reveal faults such as "stuck at 1" and "stuck at 0" in the PMR's.

In each comparator as at 22, the comparison subroutine is executed on each data word regardless of whether it is operational data or test data. The store 23 contains, and supplies, trip threshold levels to the comparator 22. As a result of this computation a "Status Bit" for each primary measurement input is set into the primary status register (PSR) 24. This status bit is a 1 if the variable is within limits or a 0 if outside the limits.

The two test data inputs are selected or modified so as to represent values on either side of the trip "window" and will therefore yield a 0 status. Hence under normally healthy conditions the PSR will contain a pattern of 0 and 1, such as 11011011, the order of which is that determined by the multiplexer inputs. The position of the status bit pattern in the PSR will advance by one bit on each complete cycle of the multiplexer as a result of cyclic relocation of the primary measurement data in the PMR's. The status word, in shifting cyclicly through the PSR, causes each bit to change state from 1 to 0 twice in every eight scans of the multiplexer inputs, i.e., the PSR is operated in a dynamic mode.

The build up of the status words is completed independently in each of the four computers and hence the respective positions of the bits which make up these words in respective PSR's will not necessarily be identical. Reorientation of the word bits is therefore necessary when the contents of the PSR's is transferred from the other 3 computers. This is done by transferring with the status words, the contents of the PMR address modifications registers and reorientating the status words by shift functions so that they occupy the same position in their respective local PSR's (25–27) as the locally generated status word. Correct orientation of the bits in the 4 status words having now been achieved, the logical operations required to perform majority voting is now executed on the four 8-bit words.

This particular configuration of 3 out of 4 voting involves the synthesis of the Boolean function AB + BC + CD + AC + AD + BD where:

A, B, C and D are four status words each containing the status 0,1 of six sub-assembly sensors (one from each group) and two test conditions.

To this end the logical AND of each pair is formed first and stored in six separate registers (28–33) labelled in FIG. 3 "logical AND registers". Then the logical OR of the six AND pairs is accumulated by successive "logical OR" instructions on the six AND words in the accumulator register (34). The culmative function is finally stored in a voted status register (VSR) (35) and will normally comprise 1 states at the six bit positions representing sub-assembly status and 0 states at the test bit positions. An 0 state of a sub-assembly bit means sub-assembly blockage. A 1 state in a test bit implies a fault in the data processing.

The voted status word will be shifted by one bit on each complete scan of the multiplexer as a result of the cyclic relocation of the primary measurement registers and consequential changes in the primary status measurement.

This cyclic shifting of the data provides some degree of testing of the intermediate storage registers used in synthesising the voted status word. Nevertheless complete test coverage of the logical functions is achieved by the following coding procedure.

The voted status word is first obtained as set out above and stored in the voted status register.

The voting procedure is then repeated six times by six passes of data. On each pass the contents of a different pair of status registers A, B, C or D is replaced by all 0s. On these passes only one term of the Boolean expression (AB + BC + CD + AC + AD + BD) can contain a 1, ie the term which comprises the two non-zero variables. Nevertheless if all the primary status bits are 1, the voted status word will contain 1s (except for the test bits) on all six passes. This process tests all parts of the majority voting operation and in addition conveys out of limits (=0) primary status information through to the voted status register.

For example suppose sensor C on one of the locations went out of limits i.e. to 0 status, the voted status on the seven passes of the majority voting would be as follows:

|  |  | AB | BC | CD | AC | AD | BD | SUM (logical OR) |
|---|---|---|---|---|---|---|---|---|
| Pass 1 |  | 1 | 0 | 0 | 0 | 1 | 1 | 1 |
| Pass 2 | A=0 | 0 | 0 | 0 | 0 | 0 | 0 | 0 |
| Pass 3 | B=0 B=0 | 0 | 0 | 0 | 0 | 1 | 0 | 1 |
| Pass 4 | C=0 C=0 | 1 | 0 | 0 | 0 | 0 | 0 | 1 |
| Pass 5 | D=0 A=0 | 0 | 0 | 0 | 0 | 0 | 1 | 1 |
| Pass 6 | C=0 A=0 | 0 | 0 | 0 | 0 | 0 | 0 | 0 |
| Pass 7 | B=0 D=0 D=0 | 0 | 0 | 0 | 0 | 0 | 0 | 0 |

If two inputs (from the same location 1-6) have 0 status, the first pass will still yield a voted status of 1 and only one of passes 2 to 7 will yield 1. Only if more than 2 inputs from one location have a 0 status will the voted status bit yield a 0 on the first pass. Examination of the bit pattern of the voted status word provides information about the voted status of the 6 sub-assemblies on the first pass of the voting, and about single sensor failures or processing faults on passes 2 to 7.

The process described is carried out simultaneously on three other computers and the ultimate control of plant actuators will depend upon majority voting of the dynamic outputs of all 4 computers. The actual form of the dynamic output derived from the voted status registers can if required be made compatible with pulse-coded semiconductor logic hardware. In this way, a number of computers each handling a small number of input signals could be combined in a hard-wired guardline covering a very large number of input signals.

It will be understood that because status words held in the PSR are shifted by one bit on each complete cycle of the multiplexer, the contents of the VSR are also advanced by one bit on each complete cycle of the multiplexer. Nevertheless under normal circumstances the VSR will always contain the same sequence of 0 and 1 status at the erd of each pass of the majority voting operation. The VSR may therefore be regarded as a shift register, the contents of which are shifted one place on each complete cycle of the multiplexer, i.e. it is operated dynamically but that after each and every voting operation its contents are normally identical indicating a healthy state. Advantage is to be seen therefore in checking the operation of the VSR.

In FIG. 4 a voted status register (VSR) at 42 is fed with binary data from the system described and, as explained, the voted status words are shifted one step at the end of each multiplexer cycle. The cyclic positions of the status bits in the VSR are shown in FIG. 5. A serial output from the VSR 42 is fed via line 43 to a hard wired dynamic recognition circuit (DRC) 44 whose function is to product a square wave or other symmetrical dynamic output at 45 when a normal pattern of 1's and 0 is recognised. In the DRC4 the serial bit pattern from the VSR 2 is taken through a number of gates 46 to increment or decrement a bidirectional binary counter 47. The gating is such as to ensure that the assignment of the two binary states out of the VSR to the two directional inputs to the counter 47 is reversed on alternate status words so that the counter 47 yields a net increment followed by a net decrement. This is because there is a larger number of 1's than 0's in each word. The initial condition of the counter is set up so that equal positive and negative residues +2 or −2 exist in the counter at the end of each consecutive word. The detection of these two particular residues are used to set and reset a bistable element 48. Any change in the balance of 1's and 0's in the bit pattern will cause a discrepancy from the normal residues and the bistable element 48 will no longer be driven from its 1 to its 0 state.

The normal alternating output of the bistable element 8 provides the required dynamic output stimulus for the system and is also fed back to the gate 46 in loop 49 to control the assignment of the input 1 and 0 states. This feedback loop 49 gives the DRC a latching facility which once the bistable element has stopped requires the manual resetting of the initial condition to restore bistable operation. This is effected by manual reset button 50.

The function of the bidirectional binary counter 47 and its associated decoder may in a modification of the foregoing, shown in FIGS. 6 and 7 of the accompanying drawings, be performed by a shift register 52 in which a marker bit is shifted between two symmetrical limits by the bidirectional inputs. The bistable element 54 would then be alternately set and reset as the marker bit reached the limits.

An additional feature of this modification is the pulse absorber 53 which prevents any single 1 or 0 state in the serial output 3 of the VSR from causing a shift of the marker bit in the shift register 52. This is achieved by the delay elements 55 which delay the opening of the corresponding AND gates 56 after the first pulse on either input to the bistable element 57. This feature makes the shifting of the marker bit in the shift register critically dependent on the binary pattern from the VSR. Any departure from the normal serial bit pattern at 3 will result in the marker bit being shifted out of the shift register 52. Having been shifted out of the register, it can only be restored by operation of the Manual Reset button 50.

What I claim is:
1. A date handling system comprising
   a scanning means for scanning a number of analogue signals from independent input lines, cyclicly
   a test signal injection means by which test signals are interleaved between at least two of said number of analogue signals,
   an analogue to digital converter means receiving said analogue signals and said test signals and delivering equivalent digital output signals,
   a primary measurement shift register (PMR) connected to receive said digital output signals and operable to overwrite or recycle said digital signals after each complete scan made by the scanning means with freshly scanned signals,
   signal extraction means for extracting signals from the shift register (PMR),
   comparator means for receiving extracted signals and comparing them with stored threshold data to yield a binary 1 or 0 according to the value of each extracted signal relative to said threshold data, a primary status register (PSR) in which the digital bits yielded by the comparator means are assembled as a binary word in which the positions of bits are advanced by one space on each cycle of the scanning means and a majority voting circuit responsive to a majority $m$ out of $n$ status bits indicating an out of tolerance condition.

2. A data handling system as claimed in claim 1 in which the values of the test signals are pitched one above and one below the threshold values set into the comparator.

3. A data handling system as claimed in claim 1 including a monitoring means for the primary status register.

4. A data handling system as claimed in claim 2 in which the monitoring means comprises a digital sequence pattern recognition circuit.

5. A data handling system as claimed in claim 4 in which the digital sequence pattern recognition circuit yields a dynamic or ac output only when the required pattern is present.

6. A data handling system as claimed in claim 1 having PMR shift register address means for advancing the PMR address relative to the scanning means by one place on completion of each scan by the scanning means whereby all the data in the PMR are moved forward one place on each successive scan.

* * * * *